US008028534B2

(12) United States Patent
Jenkins, Jr. et al.

(10) Patent No.: US 8,028,534 B2
(45) Date of Patent: Oct. 4, 2011

(54) FREEZE-TOLERANT WATERLINE VALVE FOR A REFRIGERATOR

(75) Inventors: James H. Jenkins, Jr., South Amana, IA (US); Thomas C. Anell, Knoxville, IL (US)

(73) Assignee: Whirlpool Corporation, Benton Harbor, MI (US)

( * ) Notice: Subject to any disclaimer, the term of this patent is extended or adjusted under 35 U.S.C. 154(b) by 8 days.

(21) Appl. No.: 12/499,897

(22) Filed: Jul. 9, 2009

(65) Prior Publication Data
US 2009/0266090 A1    Oct. 29, 2009

Related U.S. Application Data

(63) Continuation of application No. 11/329,569, filed on Jan. 11, 2006, now Pat. No. 7,568,357, which is a continuation-in-part of application No. 11/139,237, filed on May 27, 2005, now Pat. No. 7,337,620, and a continuation-in-part of application No. 11/131,701, filed on May 18, 2005, now Pat. No. 7,284,390.

(51) Int. Cl.
*F25D 17/02* (2006.01)
(52) U.S. Cl. .................. 62/98; 62/338; 62/340
(58) Field of Classification Search .......... 62/338–339, 62/340; 137/59–62; 138/27; 251/129.01–129.22
See application file for complete search history.

(56) References Cited

U.S. PATENT DOCUMENTS

| 2,712,733 | A | | 7/1955 | King |
| 3,146,601 | A | | 9/1964 | Gould |
| 3,146,606 | A | | 9/1964 | Grimes |
| 3,226,939 | A | | 1/1966 | Harbison |
| 3,270,519 | A | | 9/1966 | Pohl, Jr. |
| 3,386,700 | A | * | 6/1968 | Greene et al. ............. 251/175 |
| 3,429,140 | A | | 2/1969 | White |
| 3,561,231 | A | | 2/1971 | Webb |
| 3,602,007 | A | | 8/1971 | Drieci |
| 3,640,088 | A | | 2/1972 | Jacobus |
| 3,747,363 | A | | 7/1973 | Grimm |
| 3,775,994 | A | * | 12/1973 | Linstromberg et al. ......... 62/177 |
| 3,969,909 | A | | 7/1976 | Barto et al. |

(Continued)

FOREIGN PATENT DOCUMENTS
EP    1445558 A2    11/2004
(Continued)

OTHER PUBLICATIONS

Reexam of U. S. Patent No. 7,484,382, Control No. 95/001,480: EfilingAck receipt for Reexam 382 filing HOU03 1254364 1, Nov. 18, 2010.*

(Continued)

*Primary Examiner* — Melvin Jones
(74) *Attorney, Agent, or Firm* — John W. Morrison; McKee, Vorhees & Sease PLC

(57) ABSTRACT

An improved refrigerator is provided with a freeze tolerant valve for the water tank assembly in the refrigerator. The valve includes a body with an internal plastic spool which minimizes the volume of water within the valve, and which provides a space in the valve to accommodate freezing water in the valve. The valve will not crack or fail in the event of a temperature control problem in the refrigerator which results in frozen water within the valve.

14 Claims, 5 Drawing Sheets

U.S. PATENT DOCUMENTS

| | | | |
|---|---|---|---|
| 4,084,725 A | 4/1978 | Buchser | |
| 4,087,140 A | 5/1978 | Linstromberg | |
| 4,100,761 A | 7/1978 | Linstromberg | |
| 4,209,999 A | 7/1980 | Falk et al. | |
| 4,227,383 A | 10/1980 | Horvay | |
| 4,285,212 A | 8/1981 | Prada | |
| 4,306,757 A | 12/1981 | Horvay | |
| 4,333,588 A | 6/1982 | Schreck | |
| 4,543,800 A * | 10/1985 | Mawby et al. | 62/339 |
| 4,889,316 A * | 12/1989 | Donahue, Jr. | 251/129.15 |
| 5,077,985 A | 1/1992 | Buchser | |
| 5,117,654 A | 6/1992 | Steffenhagen | |
| 5,117,869 A * | 6/1992 | Kolchinsky | 137/625.65 |
| 5,165,255 A | 11/1992 | Alvarez et al. | |
| 5,211,462 A | 5/1993 | Bien | |
| 5,272,888 A | 12/1993 | Fisher | |
| 5,273,219 A | 12/1993 | Beach, Jr. | |
| 5,359,795 A | 11/1994 | Mawby et al. | |
| 5,729,997 A | 3/1998 | Witsoe | |
| 5,737,932 A | 4/1998 | Lee | |
| 5,787,724 A | 8/1998 | Pohl et al. | |
| 5,813,245 A | 9/1998 | Coates et al. | |
| 5,899,083 A | 5/1999 | Peterson | |
| 5,947,342 A | 9/1999 | Song | |
| 5,956,967 A | 9/1999 | Kim | |
| 6,019,447 A | 2/2000 | Jackovin | |
| 6,050,097 A | 4/2000 | Nelson | |
| 6,082,130 A | 7/2000 | Pastryk | |
| 6,120,685 A | 9/2000 | Carlson et al. | |
| 6,135,173 A | 10/2000 | Lee et al. | |
| 6,148,624 A | 11/2000 | Bishop | |
| 6,276,146 B1 | 8/2001 | Kim et al. | |
| 6,286,324 B1 | 9/2001 | Pastryk | |
| 6,314,745 B1 | 11/2001 | Janke | |
| 6,351,958 B1 | 3/2002 | Pastryk | |
| 6,438,976 B2 | 8/2002 | Shapiro | |
| 6,442,954 B1 | 9/2002 | Shapiro | |
| 6,457,614 B1 * | 10/2002 | Amidzich | 222/518 |
| 6,460,367 B1 | 10/2002 | DuHack | |
| 6,474,094 B2 | 11/2002 | Kim | |
| 6,532,758 B2 | 3/2003 | DuHack | |
| 6,571,567 B2 | 6/2003 | An et al. | |
| 6,735,959 B1 | 5/2004 | Najewicz | |
| 6,742,353 B2 | 6/2004 | Ohashi et al. | |
| 6,810,682 B1 | 11/2004 | Schuchart et al. | |
| 6,880,355 B2 | 4/2005 | Jung | |
| 6,964,177 B2 | 11/2005 | Lee | |
| 7,392,665 B2 | 7/2008 | Lee et al. | |
| 7,428,820 B2 | 9/2008 | Kim et al. | |
| 7,484,382 B2 | 2/2009 | Kim et al. | |
| 7,490,475 B2 | 2/2009 | Kim et al. | |
| 2001/0025505 A1 | 10/2001 | Nelson | |
| 2002/0083731 A1 | 7/2002 | Kim | |
| 2006/0218961 A1 | 10/2006 | Kim | |

FOREIGN PATENT DOCUMENTS

| | | | |
|---|---|---|---|
| JP | 47026464 | | 11/1972 |
| JP | 50069644 A | | 6/1975 |
| JP | 50154565 A | | 12/1975 |
| JP | 5341815 A | | 11/1978 |
| JP | 5694462 U | | 7/1981 |
| JP | 56164287 A | * | 12/1981 |
| JP | H06-33326 B | | 8/1994 |
| JP | H07-190578 A | | 7/1995 |
| JP | H10-148437 A | | 6/1998 |
| JP | H10-188125 A | | 7/1998 |
| JP | H10-197119 A | | 7/1998 |
| JP | H10-206004 A | | 8/1998 |
| JP | 1999325691 A | | 11/1999 |
| JP | 2000009372 A | | 1/2000 |
| JP | 2000105052 A | | 4/2000 |
| JP | 2000111229 A | | 4/2000 |
| JP | 2000146421 A | | 5/2000 |
| JP | 2000320943 A | | 11/2000 |
| JP | 2001221555 A | | 8/2001 |
| JP | 2002162139 A | | 6/2002 |
| JP | 2002350021 A | | 12/2002 |
| JP | 2002372349 A | | 12/2002 |
| JP | 2003056966 A | | 2/2003 |
| JP | 2003075050 A | | 3/2003 |
| JP | 2003090667 A | | 3/2003 |
| JP | 2003121043 A | | 4/2003 |
| JP | 2006011228 A | | 1/2006 |
| KR | 19970001294 B1 | | 2/1997 |
| KR | 1998018912 U | | 7/1998 |
| KR | 1999021017 A | | 3/1999 |
| KR | 1999030143 A | | 4/1999 |
| KR | 19970001293 A | | 5/1999 |
| KR | 19990031465 A | | 5/1999 |
| KR | 19990021540 U | | 6/1999 |
| KR | 19990043740 A | | 6/1999 |
| KR | 19990062189 A | | 7/1999 |
| KR | 19990065602 A | | 8/1999 |
| KR | 19990066209 A | | 8/1999 |
| KR | 20000028513 A | | 5/2000 |
| KR | 20000050416 A | | 8/2000 |
| KR | 20010008710 A | | 2/2001 |
| KR | 20010029590 A | | 4/2001 |
| KR | 19970062375 B1 | | 6/2002 |
| WO | 03033976 A1 | | 4/2003 |
| WO | 03102481 A1 | | 12/2003 |

OTHER PUBLICATIONS

Reexam of U. S. Patent No. 7,484,382, Control No. 95/001,480: Exhibit 1—Kim 7,484,382 Feb. 3, 2009.*

Reexam of U. S. Patent No. 7,484,382, Control No. 95/001,480: Exhibit 2—IDS 0382, Nov. 18, 2010.*

Reexam of U. S. Patent No. 7,484,382, Control No. 95/001,480: Exhibit 3—Yasuzo JP2000-009372, Jan. 14, 2000.*

Reexam of U. S. Patent No. 7,484,382, Control No. 95/001,480: Exhibit 8—Shin KR2001-0029590, Mar. 13, 2000.*

Reexam of U. S. Patent No. 7,484,382, Control No. 95/001,480: Exhibit 5—Cur 5,375,432, Dec. 27, 1994.*

Reexam of U. S. Patent No. 7,484,382, Control No. 95/001,480: Exhibit 6—Fischer 5,272,888, Dec. 28, 1993.*

Reexam of U. S. Patent No. 7,484,382, Control No. 95/001,480: Exhibit 7—Buchser 5,077,985, Jan. 7, 1992.*

Reexam of U. S. Patent No. 7,484,382, Control No. 95/001,480: Exhibit 8—Shin KR2001-0029590, Mar. 13, 2000.*

Reexam of U. S. Patent No. 7,484,382, Control No. 95/001,480: Exhibit 9—Haag 4,226,489, Oct. 7, 1980.*

Reexam of U. S. Patent No. 7,484,382, Control No. 95/001,480: Exhibit 10—Lee 6,964,177, Nov. 15, 2005.*

Reexam of U. S. Patent No. 7,484,382, Control No. 95/001,480: Exhibit 11—Chekal 7,008,032, Mar. 7, 2006.

Reexam of U. S. Patent No. 7,484,382, Control No. 95/001,480: POA 382, Nov. 18, 2010.

Reexam of U. S. Patent No. 7,484,382, Control No. 95/001,480: Request Inter Partes Reexam 382, Nov. 18, 2010.

Reexam of U. S. Patent No. 7,484,382, Control No. 95/001,480: Transmittal Reexam 382, Nov. 18, 2010.

Reexam of U. S. Patent No. 7,490,475, Control No. 95/001,481: EfilingAck receipt for Reexam 475 HOU03 1254375 1, Nov. 18, 2010.

Reexam of U. S. Patent No. 7,490,475, Control No. 95/001,481: Exhibit 1—475 Patent, Feb. 17, 2009.

Reexam of U. S. Patent No. 7,490,475, Control No. 95/001,481: Exhibit 2—IDS 475 Reexam, Nov. 18, 2010.

Reexam of U. S. Patent No. 7,490,475, Control No. 95/001,481: Exhibit 3—Cur 5,375,432, Dec. 27, 1994.

Reexam of U. S. Patent No. 7,490,475, Control No. 95/001,481: Exhibit 4—Najewicz 6,735,959, May 18, 2004.

Reexam of U. S. Patent No. 7,490,475, Control No. 95/001,481: Exhibit 5—Yasuzo JP2000-009372, Jan. 14, 2000.

Reexam of U. S. Patent No. 7,490,475, Control No. 95/001,481: Exhibit 6—Kwon KR2000-0073340, Dec. 5, 2000.

Reexam of U. S. Patent No. 7,490,475, Control No. 95/001,481: Exhibit 7—Oh KR1999-021017, Mar. 25, 1999.

Reexam of U. S. Patent No. 7,490,475, Control No. 95/001,481: Exhibit 8—Kim KR1999-0031494, May 6, 1999.
Reexam of U. S. Patent No. 7,490,475, Control No. 95/001,481: Exhibit 9—Park KR1998-0189120, Jul. 6, 1998.
Reexam of U. S. Patent No. 7,490,475, Control No. 95/001,481: Exhibit 10—Kim KR1999-0066209, Aug. 16, 1999.
Reexam of U. S. Patent No. 7,490,475, Control No. 95/001,481: Exhibit 11—Coates 5,813,245, Sep. 28, 1998.

Reexam of U. S. Patent No. 7,490,475, Control No. 95/001,481: POA, Nov. 18, 1998.
Reexam of U. S. Patent No. 7,490,475, Control No. 95/001,481: Request Reexam 475, Nov. 18, 1998.
Reexam of U. S. Patent No. 7,490,475, Control No. 95/001,481: Transmittal 475 Reexam, Nov. 18, 1998.

* cited by examiner

US 8,028,534 B2

FREEZE-TOLERANT WATERLINE VALVE FOR A REFRIGERATOR

CROSS-REFERENCE TO RELATED APPLICATIONS

This application is a continuation application of U.S. application Ser. No. 11/329,569 filed Jan. 11, 2006, which is a continuation-in-part application of U.S. application Ser. No. 11/139,237 filed on May 27, 2005, which is a continuation-in-part of U.S. application Ser. No. 11/131,701 filed May 18, 2005.

BACKGROUND OF THE INVENTION

Ice and water dispensers are common in household refrigerators. Typically, the water system components, such as a tank, valves, a filter and tubing are located in the refrigerator throughout the cabinet and base pan areas. This arrangement is prone to service calls to repair leaks and water restrictions due to the large number of connections or fittings for the components. The multiple connections in various tubing lengths also adds to the manufacturing costs. Also, while the water system components are not intended to be subjected to freezing temperatures, refrigeration control problems can cause freezing temperatures to occur which can lead to further problems. For example, if the water inside the valve freezes, the frozen water expansion will cause the valve to crack. Then, when the freezing temperature is eliminated, the frozen water will thaw and leak from the valve.

Therefore, a primary objective of the present invention is the provision of an improved valve for the waterline in a refrigerator.

Another objective of the present invention is the provision of a freeze tolerant waterline valve for a refrigerator.

Still another objective of the present invention is the provision of a method of preventing failure of a valve in a refrigerator waterline due to freezing temperatures.

Yet another objective of the present invention is the provision of a refrigerator waterline valve having a spool in the inlet barrel of the valve to displace water out of the barrel upon freezing.

Another objective of the present invention is the provision of a refrigerator waterline valve having an air space within the valve body so as to accommodate expansion of freezing water in the valve.

A further objective of the present invention is the provision of an improved valve for a refrigerator waterline that does not subject the body of the valve to the direct mechanical force of expanding ice.

A further objective of the present invention is the provision of an improved valve for a refrigerator waterline which is economical to manufacture and durable in use.

These and other objectives will become apparent from the following description of the invention.

BRIEF SUMMARY OF THE INVENTION

The refrigerator of the present invention includes a water tank for storing water, with a water inlet line and a water outlet line. The improved valve of the invention is placed in the outlet line to control flow of water from the tank to the icemaker and/or water dispenser. The valve has a body or barrel in which a plastic spool is mounted. The spool has a passageway and is there through with a diameter approximately the same as the diameter of the waterline, so as to minimize the volume of water within the valve. If a control problem arises in the refrigerator which reduces the temperatures below freezing, the water in the spool will freeze and expand, but the plastic spool will absorb the expansion forces of the freezing water so as to prevent cracking and failure of the valve. The spooled geometry also provides air space within the valve body to accommodate expansion of freezing water without subjecting the body of the valve to the mechanical force of the expanding ice.

DETAILED DESCRIPTION OF THE PREFERRED EMBODIMENT

Figure 1:
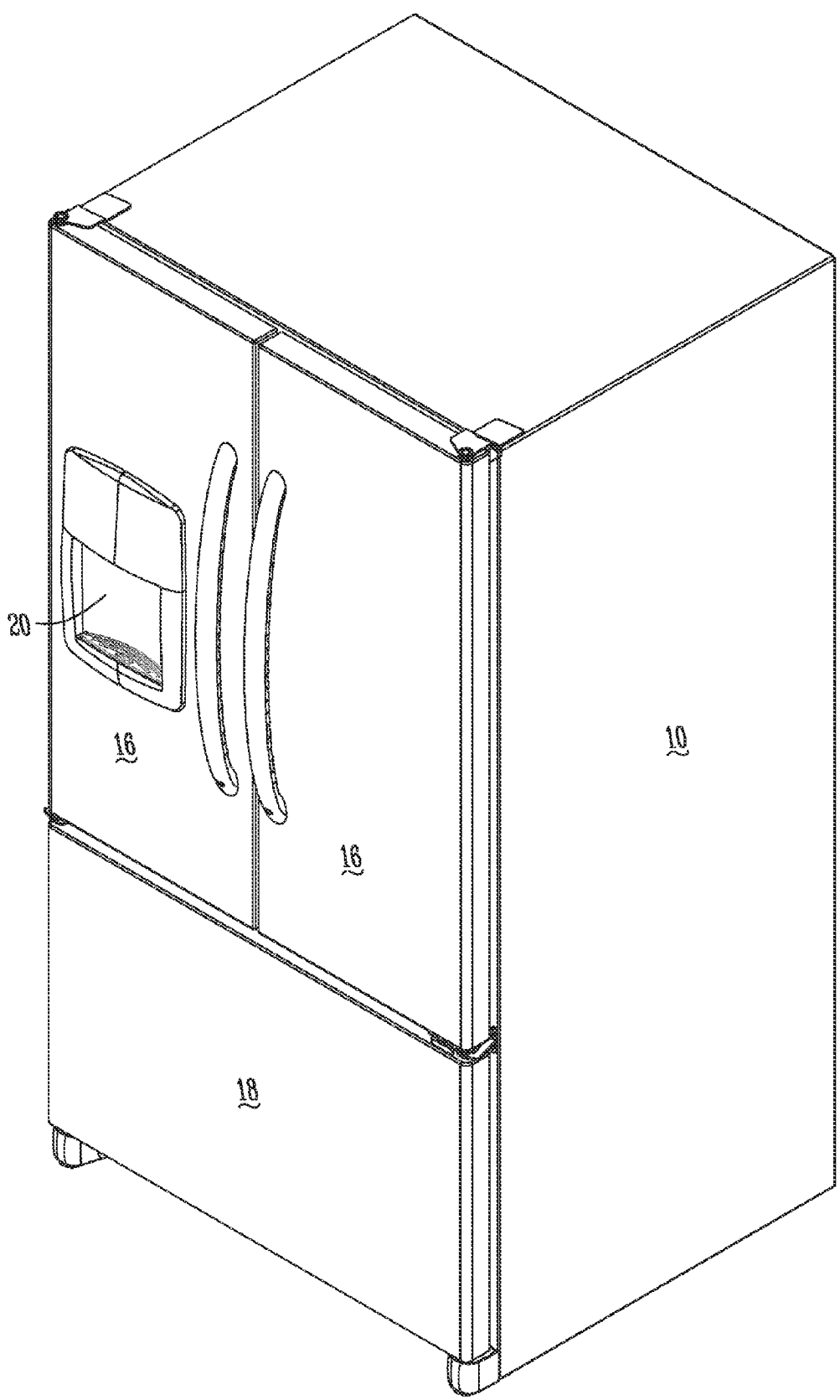
FIG. 1 is a perspective view of a bottom mount refrigerator having the waterline valve of the present invention.
Figure 2:
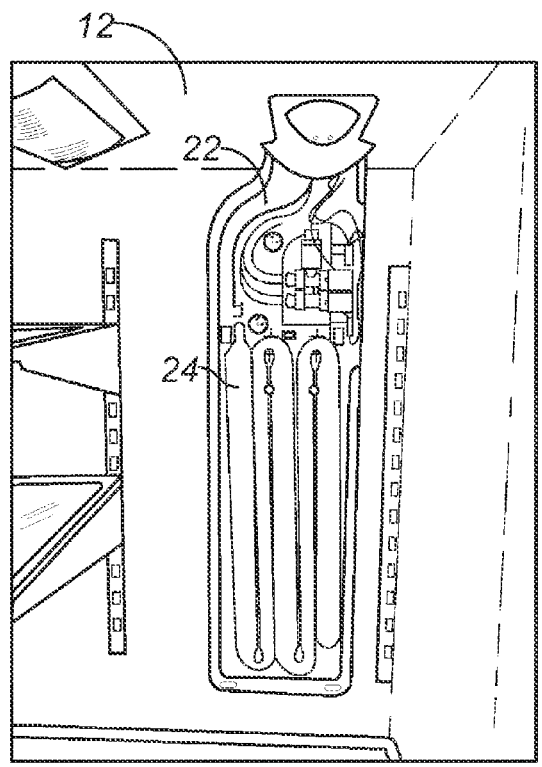
FIG. 2 is a front view of the fresh food compartment of the refrigerator showing a cover for the water tank assembly.
Figure 3:
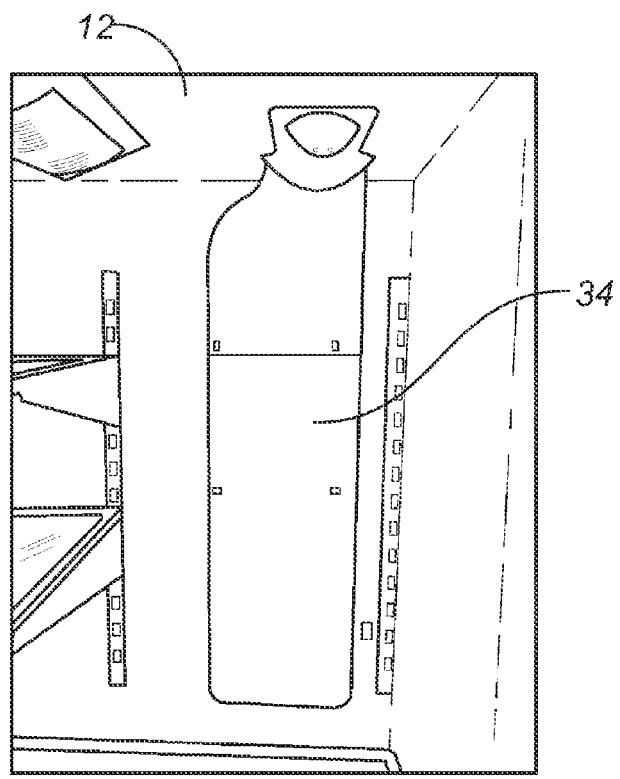
FIG. 3 is a front view of the water tank assembly residing within the cavity in the rear wall of the fresh food compartment, with the cover removed.
Figure 4:
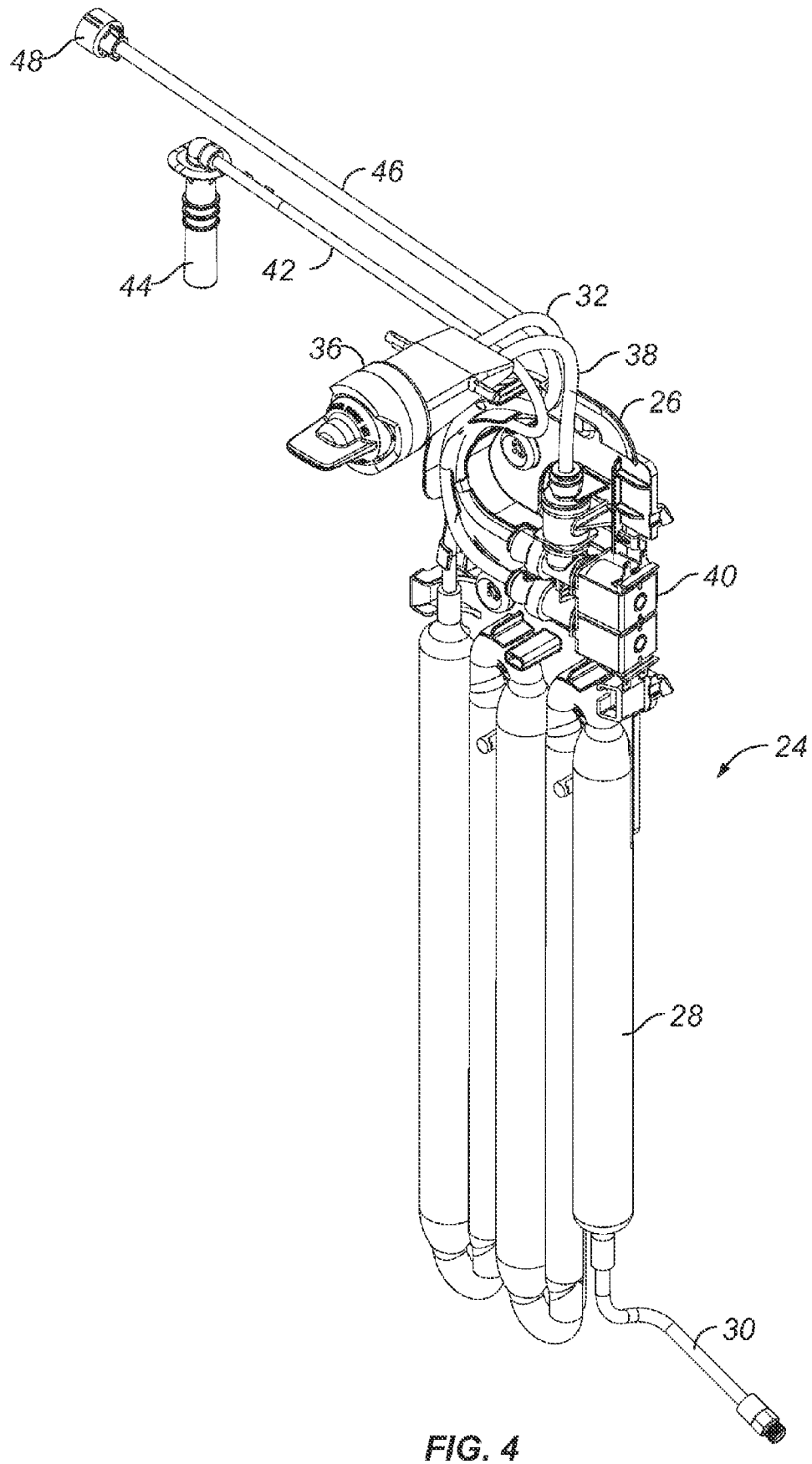
FIG. 4 is a perspective view of the water tank assembly, with the valve of the present invention.
Figure 5:
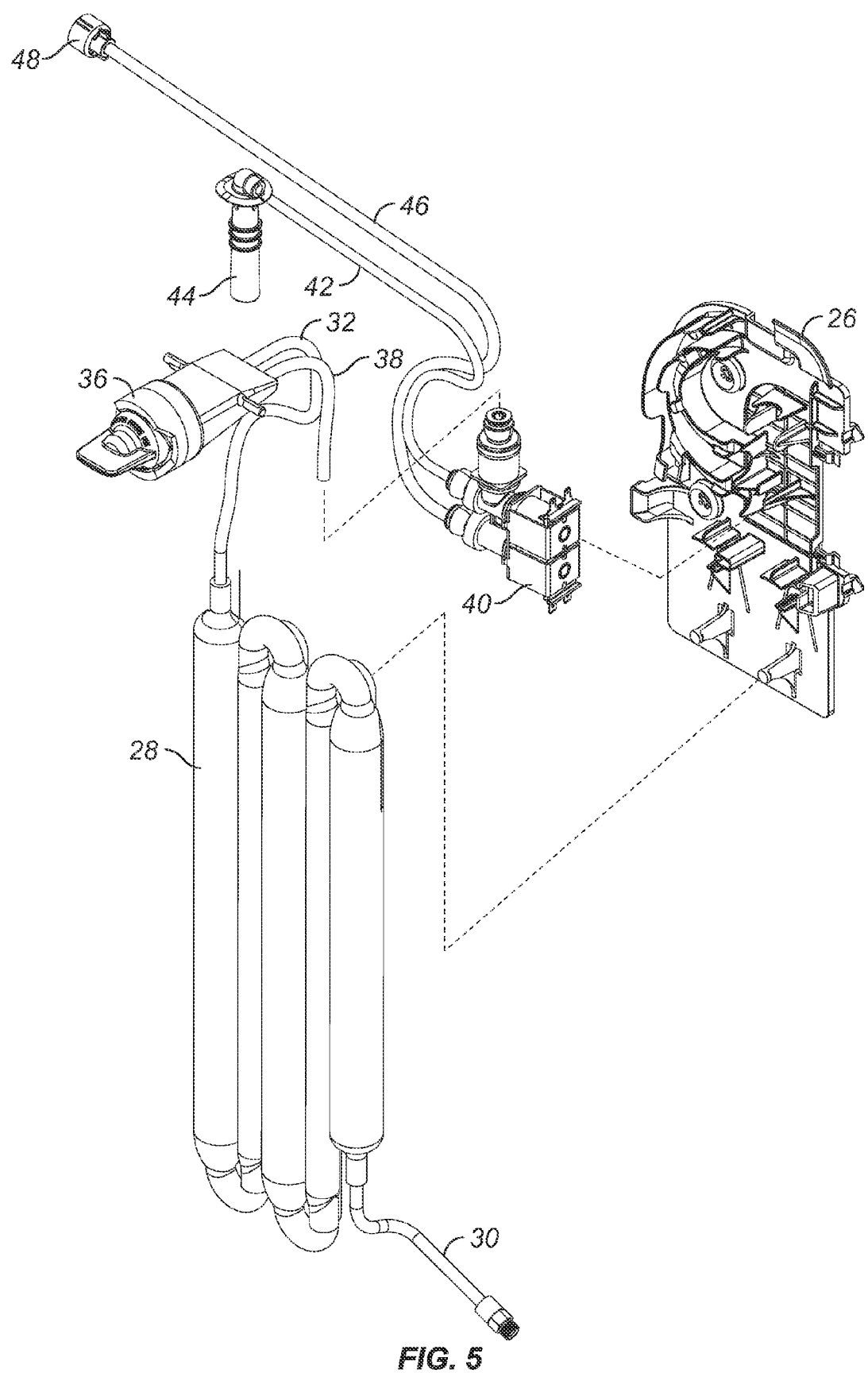
FIG. 5 is an exploded view of the water tank assembly.
Figure 6:
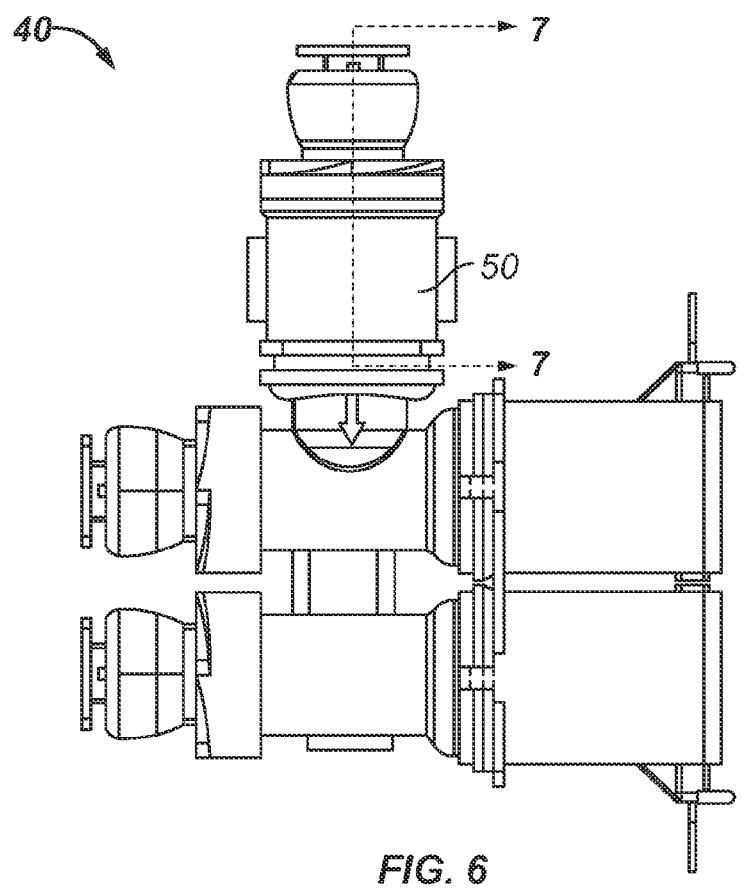
FIG. 6 is a front elevation view of the freeze tolerant waterline valve of the present invention.
Figure 7:
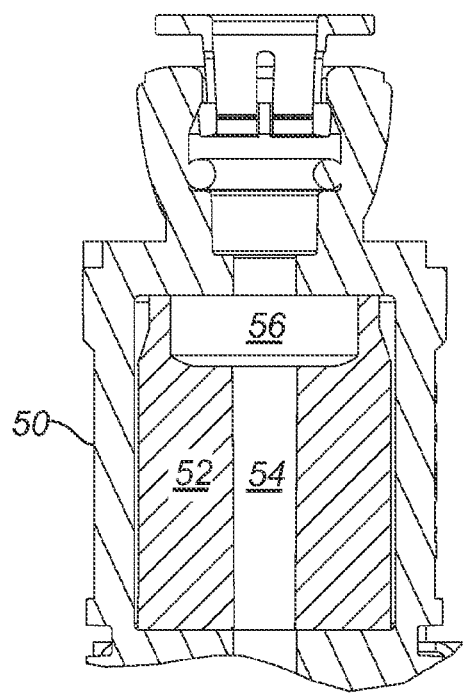
FIG. 7 is a sectional view of the valve taken along lines 7-7 of FIG. 6.

The present invention is directed towards a freeze-tolerant waterline valve for a refrigerator. The valve may be used in any refrigerator having an ice and/or water dispenser, including a bottom mount refrigerator, a top mount refrigerator, or a side-by-side refrigerator.

In the drawings, a bottom mount refrigerator is generally designated by the reference numeral 10. The refrigerator 10 includes a fresh food compartment 12 and a freezer compartment 14. Doors 16 are provided for the fresh food compartment 12 and a door 18 is provided for the freezer compartment. An ice and/or water dispenser 20 is provided in one of the doors 16.

The fresh food compartment 12 includes a recess or cavity 22 in the rear wall adapted to receive a water valve and tank assembly 24. The assembly 24 includes a mounting bracket 26 which is secured in the recess 22 in the back wall of the fresh food compartment 12 in any convenient manner. A water tank 28 is mounted on the bracket 26 and includes a water inlet line 30 and a water outlet line 32. A cover 34 attaches to the rear wall of the fresh food compartment 12 so as to hide the water tank 28 from view when the door 16 of the fresh food compartment 12 is opened. The water system 24 is pre-assembled in a single module that can be quickly and easily installed. The module 24 has less tubing runs and connections between components as compared to prior art water systems.

The water inlet line 30 is connected to a conventional water supply line. The water outlet line 32 is operatively connected to a filter 36. Preferably, the filter 36 is pivotally mounted in the ceiling of the fresh food compartment 12, as disclosed in Applicant's co-pending application Ser. No. 10/195,659, entitled HINGE DOWN REFRIGERATOR WATER FILTER, filed Jul. 15, 2002, which is incorporated herein by reference.

The water filter 32 has an outlet line 38 which is connected to a water solenoid valve 40 mounted on the bracket 26. The valve 40 has a first outlet line 42 leading to the icemaker fill tube 44 and a second outlet line 46 leading to the water dispenser of the refrigerator 10. Line 46 has a fitting 48 which provides a quick connection with a simple ¼ turn, without threads, to the water dispenser line in the door 16.

In prior art refrigerators, the water tank is normally located downstream of the water valve and filter, so as to prevent subjecting the water tank to inlet water supply pressures. In this invention, the tank 28 is designed to withstand inlet water supply pressures. The location of the tank 28 in the recess 22 allows greater fresh food storage capacity. Also, the location of the tank 28 upstream from the filter 36 and the valve 40 will reduce the service call rate. The downstream location of the filter 36 also removes plastic tastes associated with the plastic tank 28, and allows chlorinated water to be stored in the tank 28, which reduces microbiological growth on the interior of the water tank 28.

The valve 40 includes a body or barrel 50 in which a flexible, plastic spool 52 is received. The spool 52 includes a longitudinal passage 54 having a diameter substantially equal to the diameter of the waterline 38. The spool 52 substantially fills the volume of the body 50, occupying at least 60% of the body volume. The body 50 and spool 52 define an internal space 56 in the valve 40 to accommodate expansion of freezing water within the spool 40.

The structure of the valve 40 minimizes the volume of water within the valve. Therefore, in the event of a temperature control problem in the refrigerator 10 which results in freezing temperatures, the mechanical forces of expansion of the small amount of water within the valve 40 are absorbed by the spool 52. A space 50 within the valve 40 also accommodates the increased volume of the freezing water within the valve 40. Thus, the freeze-tolerant valve 40 will not crack or fail in the event of freezing water within the valve.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. An improved refrigerator comprising:
    a water tank for storing water, the water tank having an inlet line and an outlet line;
    a valve in the outlet line to control flow of water from the tank, the valve having an inlet and an outlet; and
    an annularly shaped compressible spool within the valve, the spool being compressible to absorb expansion forces in case of water freezing within the valve to thereby prevent the valve from cracking, the spool having an axial passage for allowing flow of water from the valve inlet to the valve outlet.

2. The refrigerator of claim 1 wherein the valve includes a barrel in which the spool is received, and further wherein the spool and barrel define an expansion space to further accommodate expansion of freezing water within the spool.

3. The refrigerator of claim 2, wherein the barrel has a hollow volume, and wherein the spool occupies at least 60% of the hollow volume.

4. The refrigerator of claim 1, wherein a filter is connected to the outlet line between the water tank and the valve to filter water that flows from the water tank to the valve.

5. The refrigerator of claim 2, wherein the spool has an airtight seal with the barrel.

6. A valve for controlling a flow of water to an ice maker, the valve comprising:
    an inlet portion for receiving water, the inlet portion including an inlet passage;
    a body portion located below the inlet portion, the body portion having a hollow interior in communication with the inlet passage;
    a spool within the hollow interior of the body, the spool having an axial passage for providing water from the inlet portion to an outlet portion; and
    an enlarged space in communication with the inlet passage and the spool axial passage to allow for expansion of freezing water in the spool axial passage.

7. The valve of claim 6, wherein the spool is compressible to absorb expansion forces of freezing water in the spool passageway.

8. The valve of claim 7, wherein the spool occupies at least 60% of the hollow interior of the body.

9. The valve of claim 6, wherein the inlet receives water from a storage tank.

10. The valve of claim 6, wherein the inlet passage and the axial passage have diameters that are substantially equal to each other.

11. A method of preventing failure of a waterline valve in a refrigerator, the method comprising:
    directing water into a valve that includes a compressible spool with an axial passage, the axial passage permitting flow of water from a valve inlet to a valve outlet; and
    allowing water in the axial passage to freeze and thereby compress the spool without cracking the valve.

12. The method of claim 11, further comprising:
    directing water from a storage tank through a filter before directing water into the valve.

13. The method of claim 11, further comprising providing an enlarged space in the valve in communication with the axial passage and allowing the freezing water in the axial passage to expand into the enlarged space.

14. The method of claim 11, wherein the spool occupies at least 60% of a hollow space within the valve.

\* \* \* \* \*